US007041182B2

(12) United States Patent
Horikiri

(10) Patent No.: US 7,041,182 B2
(45) Date of Patent: May 9, 2006

(54) METHOD OF PRODUCING A DECORATIVE PLATE

(75) Inventor: Yataro Horikiri, Taito-ku (JP)

(73) Assignee: Sakura Hobby Craft Co., Ltd., Tokyo (JP)

( * ) Notice: Subject to any disclaimer, the term of this patent is extended or adjusted under 35 U.S.C. 154(b) by 290 days.

(21) Appl. No.: 10/369,747

(22) Filed: Feb. 21, 2003

(65) Prior Publication Data

US 2004/0163750 A1 Aug. 26, 2004

(51) Int. Cl.
*B32B 31/00* (2006.01)

(52) U.S. Cl. ........................ 156/63; 156/296; 206/575; 428/542.2; 434/81

(58) Field of Classification Search .................. 156/63, 156/297, 299; 434/81, 84, 96, 98; 206/575; 428/542.2, 542.6
See application file for complete search history.

(56) References Cited

U.S. PATENT DOCUMENTS 1,220,097 A * 3/1917 Grundy et al. ................ 156/63
2,588,321 A * 3/1952 Hahn .......................... 434/95
3,084,455 A * 4/1963 Demler ........................ 434/81
3,176,836 A * 4/1965 Gunn .......................... 434/84
3,846,214 A * 11/1974 Rosenzweig ................. 428/39
3,976,807 A * 8/1976 Sweeney et al. .............. 428/16
5,292,255 A * 3/1994 Goldwasser ................. 434/84

FOREIGN PATENT DOCUMENTS

JP 2002-264600 A * 9/2002

* cited by examiner

*Primary Examiner*—Jeff H. Aftergut
(74) *Attorney, Agent, or Firm*—Wenderoth, Lind & Ponack, L.L.P.

(57) ABSTRACT

A method of producing a decorative plate includes affixing a plurality of pieces (segments) for forming a decorative image to a predetermined position of a base plate on which a base design is depicted. Specifically, the method includes providing marks (or signs) on the base design of the base plate in a close contact relation with each other, the marks each having the affixing order therein by means of shade (gradation) of a color of the image to be produced. The pieces (segments) are affixed to predetermined positions of the base plate according to the shade (gradation) of the color of the image. This permits an affixing operation in an accurate order by simply seeing only the color (gradation) on the base plate.

5 Claims, 2 Drawing Sheets

METHOD OF PRODUCING A DECORATIVE PLATE

BACKGROUND OF THE INVENTION

This invention relates to a method of producing a decorative plate which presents a three-dimensional or stereoscopic shape and feeling by affixing a number of colored pieces (or segments and components for a picture of the decorative plate) to predetermined positions on a base plate in such a manner that the colored pieces at adjacent locations are partly overlapped.

In a conventional method of producing the decorative plate of pieces in an overlapping relation, the order of affixing the pieces is very important. If the affixing order is not followed according to the directory (instructions) but is changed erroneously or unexpectedly, an upper-lower relation of the pieces is reversed, resulting in a big change in the finished image of the decorative plate. Accordingly, it is quite important that the affixing order is observed according to the explanation and instructions disclosed in an instruction leaflet or production manual.

However, the conventional method requires a user to confirm the affixing order by noting the required order of affixing the pieces at every affixing operation, and this requires a substantial labor, time and patience until the manufacturing method is completed. Therefore, the conventional method possibly deprives the user of his or her production motivation and enthusiasm.

SUMMARY OF THE INVENTION

It is, therefore, a general object of the present invention to provide a new method of producing a decorative plate which permits production with less time and labor without relying upon the production instructions.

According to the present invention, there is provided a method of producing a decorative plate in which a plurality of pieces (segments) for forming a decorative image are affixed to a predetermined position of a base plate on which a base design is depicted.

The method includes providing marks (or signs) on the base design of the base plate in a close contact relation with each other, the marks each having the affixing order therein by means of shade (gradation) of a color of the image to be produced. The affixing the pieces (segments) are affixed to a predetermined position of the base plate according to the shade (gradation) of the color of the image. This method permits an affixing operation in an accurate order by simply seeing only the color (gradation) on the base plate.

In a preferred embodiment of the invention, the marks (or signs) on the base plate are circular and the segments are circular having a larger diameter than a diameter of each of the marks so that the pieces are affixed in a partly overlapping relation with each other.

In another embodiment of the invention, the marks (or signs) on the base plate have symbols or codes for representing colors. This permits easy determination of the pieces (segments) of selected colors, and facilitates an affixing operation of the pieces on the base plate.

DETAILED DESCRIPTION OF THE EMBODIMENTS

Figure 1:
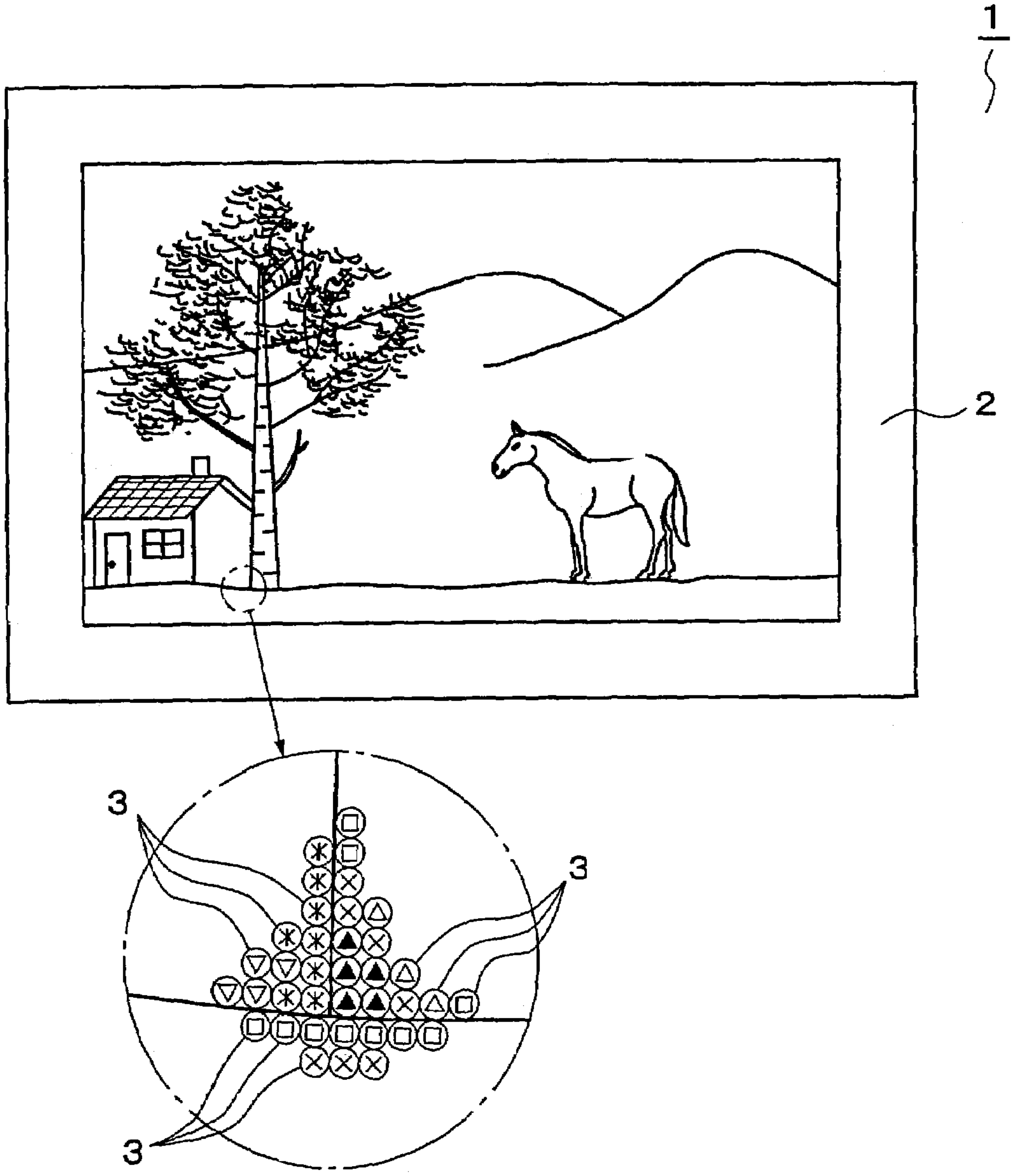
FIG. 1 is a plan view of a base plate for a decorative plate of the present invention with a circled portion enlarged.

Referring first to FIG. 1, a planar-shaped base plate 2 made of cardboard, paperboard or other suitable materials is prepared. On the base plate 2, blocks of base designs or sketches such as a mountain, ground, tree, house, horse, etc. are depicted as shown. A number of circular marks 3 for identifying the location of affixing pieces (segments) of an image or picture are printed on each of the blocks of the base designs in such a manner that adjacent circular marks closely contact each other. The circular marks have a constant diameter (for example, 2.1 mm). Each of the marks 3 has symbols or codes such as ∇, □,*, etc. therein for discriminating (identifying) the colors (such as red, green, etc.). In addition, color gradation (that is, shade or depth of a color) is provided to show and instruct the accurate order of affixing the pieces (segments) 5 for the image to be produced. The color gradation is composed of multi-stage shades such as light red, middle-stage red and dark stage, and so forth. Namely, not only symbols or codes for color discrimination, but also the shade or gradation (from light to deep) of each color is printed on the spots of the mark 3.

Figure 2:
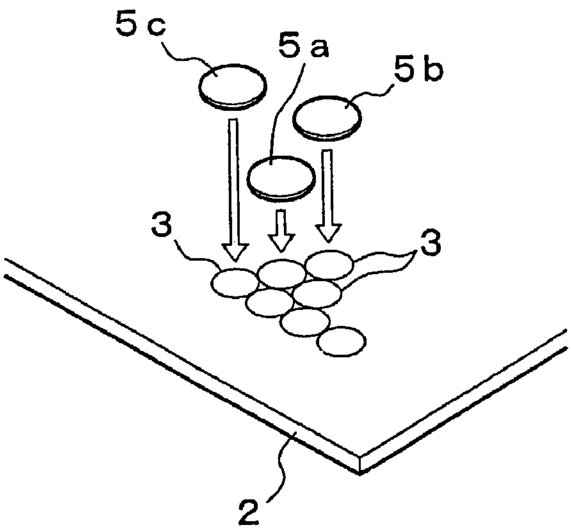
FIG. 2 shows a method of affixing the pieces (segments) to the base plate.
Figure 3:
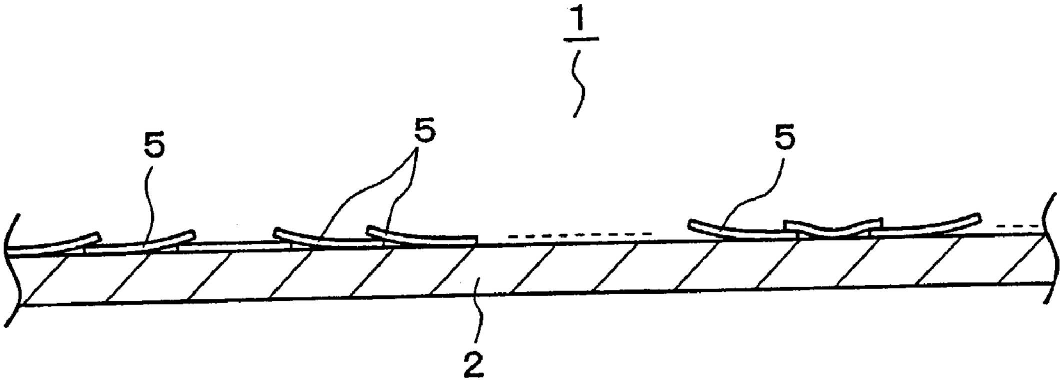
FIG. 3 is a sectional view of the decorative plate according to the present invention showing partially overlapped pieces (segments).

With reference to FIG. 2, a predetermined number of pieces or segments 5 (such as 5*a*, 5*b*, 5*c* in the drawing) are prepared for being affixed to the marks 3 on the base plate 2. As illustrated in FIGS. 2 and 3, each of the pieces is circular and flat (i.e., disk-shaped). Each of the pieces 5 has a diameter of, for example, 3 mm, which is larger than a diameter of each of the circular marks 3 for location identification. Each piece 5 has a colored front surface such as red, blue, yellow, etc., (i.e., a solid-colored surface) and a back surface with a suitable adhesive agent coated thereon. In a preferred embodiment of the invention, the pieces of one color are removably formed on one storage sheet and the pieces of another color are removably formed on another storage sheet. The pieces are removably formed on the sheet so that the pieces can be removed quite easily by a simple tool such as an awl, stylus, or even toothpick.

Then, according to the color discrimination (identification) symbols or codes of the location identification marks 3 on the base plate 1, the related pieces or segments 5 are affixed to the related position of the marks 3 in order. For example, with respect to all the location identification marks 3 having a specific symbol or code (for example, Δ) which represents a color of red, the pieces or segments 5*a* (of light-red) are affixed to the mark 3 which has a color gradation of "light" (i.e., a light color gradation indication), and then the pieces or segments 5*b* (of middle light-red) are affixed to the mark 3 which has a color gradation of "middle light". Then, the pieces or segments 5*c* (of deep red) are affixed, in a similar manner as described the above, to the mark 3 which has a color gradation of "deep" (or "dark"). The affixing operation can be made by using a simple tool such as an awl, stylus or by using a toothpick.

Thus, the marks 3 for location identification closely contact each other, and the pieces which will be affixed to the marks 3 have a diameter larger than the diameter of the mark 3. Therefore, the pieces 3 are affixed in a partially overlapped relation as illustrated in FIG. 3. Mere attention to the color gradation of the location identification marks 3 permits a correct and quick affixing operation of the pieces (segments) to the predetermined positions in the prescribed order so that a required decorative plate can be completed in a short time without repeatedly reviewing the instructions of the production manual.

In the embodiment described above, although both the location identification marks 3 and the pieces (segments) 5 are formed in a circular or round configuration, they can be modified into other shapes if the pieces 5 can be affixed in a partial overlapping relation.

Further, the color discrimination symbols or codes can be eliminated if a single color image is required in the decorative plate.

According to the present invention, there is provided a method of producing a decorative plate in which a plurality of pieces (segments) for forming a decorative image are affixed to a predetermined position of a base plate on which a base design is depicted. The method includes providing marks (or signs) on the base design of the base plate in a close contact relation with each other, the marks each having the affixing order therein by means of shade (gradation) of a color of the image to be produced, and affixing the pieces (segments) to a predetermined position of the base plate according to the shade (gradation) of the color of the image. This permits an affixing operation in an accurate order by simply seeing only the color gradation symbols or codes which are printed on the base plate.

What is claimed is:

1. A method of producing a decorative plate, comprising:

forming marks on a base design on a base plate so that the marks closely contact each other, each of the marks having only a single symbol for identifying each color and having a color gradation indication; and affixing differently-colored pieces to the marks according to the symbol and the color gradation indication of the marks so as to form a decorative image, said affixing comprising affixing appropriately colored pieces to the corresponding marks in an order based on the color gradation indication of the marks.

2. The method of claim 1, wherein each of the marks formed on the base plate has a circular shape, and each of the pieces has a circular shape, each of the circular-shaped pieces having a diameter larger than a diameter of each of the circular-shaped marks so that the pieces are affixed to the marks in a partially overlapping manner.

3. The method of claim 1, wherein each of the pieces comprises a disk-shaped piece, said affixing comprising attaching each of the disk-shaped pieces to a corresponding mark by adhesive.

4. The method of claim 1, wherein each of the pieces has a solid-colored front surface and a back surface with an adhesive coating.

5. The method of claim 4, wherein each of the pieces comprises a disk-shaped piece, further comprising, prior to said affixing, removing the pieces from storage sheets, wherein the pieces on each of the storage sheets are the same color, said affixing comprising affixing the disk-shaped pieces removed from the storage sheets to the marks.

* * * * *